United States Patent
Wilkens et al.

[11] Patent Number: 6,012,271
[45] Date of Patent: Jan. 11, 2000

[54] ROUND BALER WITH A LOAD SENSOR FOR ACTUATING THE WRAPPING APPARATUS AND FOR TURNING OFF AT LEAST ONE DELIVERY ELEMENT

[75] Inventors: Dieter Wilkens, Wolfenbüttel-Ahlum; Joost Honhold, Wolfenbüttel; Jürgen Röhrbein, Vechelde, all of Germany

[73] Assignee: Welger GmbH, Wolfenbuttel, Germany

[21] Appl. No.: 09/009,611

[22] Filed: Jan. 20, 1998

[30] Foreign Application Priority Data

Jan. 17, 1997 [DE] Germany .......................... 197 01 421

[51] Int. Cl.$^7$ .................................................. A01D 75/18
[52] U.S. Cl. ...................... 56/10.3; 56/341; 56/DIG. 15; 100/88
[58] Field of Search ........................... 56/341, 343, 10.3, 56/10.2 G, DIG. 15; 100/88

[56] References Cited

U.S. PATENT DOCUMENTS

| | | | |
|---|---|---|---|
| 4,161,097 | 7/1979 | Vansteelant | 56/343 |
| 4,246,743 | 1/1981 | Anstee et al. | 56/341 |
| 4,306,403 | 12/1981 | Hubbard et al. | 56/10.3 |
| 4,321,991 | 3/1982 | Teijido et al. | 56/10.3 |
| 4,403,544 | 9/1983 | Naaktgeboren | 100/189 |
| 4,425,753 | 1/1984 | Freimuth | 56/341 |
| 4,434,607 | 3/1984 | Campbell | 56/341 |
| 4,567,718 | 2/1986 | VanGinhoven | 56/341 |
| 4,611,535 | 9/1986 | Anstey et al. | 100/43 |
| 4,750,323 | 6/1988 | Sheehan et al. | 56/341 |
| 5,226,359 | 7/1993 | Rempe | 100/88 |
| 5,408,817 | 4/1995 | Wagstaff | 56/341 |
| 5,551,218 | 9/1996 | Henderson et al. | 53/504 |
| 5,605,095 | 2/1997 | McClure | 100/99 |
| 5,615,544 | 4/1997 | Berger et al. | 56/341 |

FOREIGN PATENT DOCUMENTS

| | | |
|---|---|---|
| 2910365 | 10/1980 | Germany . |
| 3112714 | 11/1982 | Germany . |
| 3524944 | 1/1987 | Germany . |
| 4104643 | 8/1992 | Germany . |
| 4231412 | 3/1994 | Germany . |
| 9312143 | 11/1994 | Germany . |
| 2960167 | 1/1996 | Germany . |
| 4430251 | 2/1996 | Germany . |
| 19538370 | 10/1996 | Germany . |
| 29514322 | 11/1996 | Germany . |
| 2105644 | 3/1983 | United Kingdom ..................... 56/341 |

*Primary Examiner*—Thomas B. Will
*Assistant Examiner*—Arpad Fabian Kovacs
*Attorney, Agent, or Firm*—Brown & Wood, LLP

[57] ABSTRACT

A round baler for fibrous agricultural material including compression and delivery elements, a main drive for driving the same, a wrapping apparatus, and at least one load sensor provided in the drive line for the compression elements for generating a control signal for actuation of the wrapping apparatus and/or turning off of the delivery elements.

14 Claims, 2 Drawing Sheets

ROUND BALER WITH A LOAD SENSOR FOR ACTUATING THE WRAPPING APPARATUS AND FOR TURNING OFF AT LEAST ONE DELIVERY ELEMENT

BACKGROUND OF THE INVENTION

1. Field of the Invention

The present invention relates to a round baler for fibrous agricultural material such as hay, straw and silage and including a plurality of compression elements, delivery elements, drive means for driving the same and including a main drive and chain or belt means connecting the main drive with respective elements, and at least one wrapping apparatus for binding compressed bales.

2. Description of the Prior Art

Round baler with a cutting section, in which the picked up stem crop is chopped by a plurality of blades engageable with the conveying rotor to a greater or less extent before compression, find an increasingly greater application, in particular for use in forming silage bales. Up to the present, usually from 3 to 14 blades were used, however, the tendency is to use from 20 to 30 blades to achieve even a greater compression density. This can substantially increase the power demand of the round balers. In extreme cases, the power demand of round balers with a cutting section can be twice as large as that of round balers without a cutting section.

Thus, the prospectus Roll Presses RP 200, Publication 8.96, describes round balers in which the main drive chain from a tractor to the main drive of the baler is protected from an overload, and in which a so-called cam clutch, e.g., such as Fabrikats Walterscheid K64, is provided in front of the main drive and turns off the entire drive of the baler in case the entire torque of the baler exceeds a predetermined magnitude.

The use of this well known cam clutch is accompanied by two serious drawbacks:

If a baler is protected by setting actuation of the cam clutch at a torque value which provides for optimal density of a short-cut stem crop, the use of a baler without a cutting section leads to a too high drive torque applied to the compression elements and their drives, which, considering that almost the entire drive power, except a relative small amount required by the pick-up means (about 2–3 kw) is spent for driving the elements located the bale chamber, can result in a destruction of these drives and/or the compression elements.

Upon actuation of the cam clutch, the entire drive of the baler is turned off, and the bales remain in the bale chamber. Restart of the baler is often become impossible. To do this, the bale chamber is opened and unloaded. Only then the drive of the baler is restarted. A particular disadvantage of this consists in that the unbound content of the bale chamber is removed which can be bound only with great difficulties. Balers with limited hydraulic opening of the bale chamber are described in Prospectus Class Rollant 66,46 silage, 46 Roto Cut, Publication August 1995.

The drawback of this solution consists in that oversized bales are not suitable for being wrapped with a foil in a foil wrapping machine, and often should be cut and "over-pressed."

European Publication EPO 150 629 B1 discloses a round baler in which a torque indicator is mounted on the main drive shaft and controls the tensioning device for the belts. When drive torque exceeds a certain threshold, the belts are somewhat slackened. The use of the torque indicator permits to reduce the response frequency of the slipping clutch in the main drive shaft during pick-up of swath accumulations.

Accordingly, an object of the present invention is to provide means for preventing an overload of compression elements and their drives, in particular, under different operational conditions, e.g., with or without use of cutting sections.

SUMMARY OF THE INVENTION

This and other objects of the present invention, which will become apparent hereinafter, are achieved by providing in the drive chain between the main drive of the baler and the compression elements at least one load sensor which, upon load rate of press elements reaching a predetermined magnitude, generates a control signal which is used for actuation of the wrapping apparatus and/or turning off of at least one delivery element.

Because according to the invention, it is the load rate of main power consumers, the compression elements, which leads to actuation of the wrapping apparatus, no overloading of the compression elements takes place at processing different crops, at different outputs and, in particular, independent on whether baler with or without a cutting section is used. To achieve an optimal compression density, the load rate is so adjusted that the wrapping apparatus is actuated when the load sensor registers a load rate which, e.g., about 5% lower than the maximum allowable load rate. This insures finishing the formation of a bale without overloading of the compression elements. The load sensor, as discussed above, also provides for turning off of the delivery elements, e.g., of the pick-up member and/or the conveying rotor, which results in turning off the operation of the cutting section. The turning off of the conveying rotor permits to avoid disturbances in the binding process which may result, for example, from the conveying rotor entraining the net and its winding about the rotor.

According to an advantageous embodiment of the present invention, at least one overload clutch is associated with the delivery elements, which is actuated by a control signal generated by the load sensor in response to the load rate of the compression elements exceeding a maximum allowable load rate, for turning off at least the pick-up member. This stops delivery of the crop stems into the bale chamber so that overloading, even in case of disturbances in the operation of the wrapping apparatus, becomes impossible. Binding can be effected at the latest simultaneously with the turning off of the delivery elements by the actuation of the wrapping apparatus with the same control signal of the load sensor. The wrapping apparatus can also be actuated manually. According to the invention, the load rate of the main power consumer, namely, of the compression elements, is used as a control parameter for actuation and/or turning off respective functions of a round baler. Because of this, protection of the main drive chain is insured, i.e., of the input shaft of the main drive. This also insures protection of the delivery elements against overload by a smaller threshold torque, which is rather cost-effective.

According to the invention, the delivery elements can also be associated with an automatically actuated overload clutch, which turns off the drives of the delivery elements, at least the drive of the pick-up member, at the latest when the load rate of the conveying rotor and of the cutting section is just below the maximum load rate of the compression elements. This insures that binding of the bales is still possible. Thereby, the drive is protected twice, namely, on one hand, by actuation of the wrapping apparatus with a signal generated by the load sensor, which senses the load rate of the compression elements. At this, the tractor driver usually, at the beginning of the binding operation, hears a signal sound and stops the pick-up of crop. On the other hand, by an automatic turning off of the pick-up member at the maximum load rate when for some reasons, the binding is not initiated by the load sensor in an orderly manner.

According to a further development of the present invention, the torque splitting main drive is provided with two output shafts one of which drives the compression elements and is equipped with a load sensor, while the other one of the two output shafts drives one or more delivery elements and is equipped with an overload clutch. The provision of two output shafts, in particular when a cutting section is provided permits to equally divide the torque, which is generated by the main drive, between the two shafts. This is because, in particular at the end of the compression process, the power demand of the compression elements only slightly greater than the power demand of the rotor-cutter, and both the compression elements and the delivery elements operate close to their load thresholds.

According to the invention, the main drive can operate without the torque splitting, with a single shaft which drives both the compression elements and the delivery elements. At that, the load sensor is so arranged that it senses only the load rate of all or almost all of the compression elements, with the overload clutch being provided in the drive chain for the delivery elements.

In case the main drive is provided with two output shafts, a conventional torque indicator can be used as a load sensor. In this case, the torque indicator is mounted on the output shaft which drives the compression elements.

A constructively simple and cost effective load sensor is provided when a section of the drive shaft, which drives the compression elements is reduced in size and is formed as a torsion section, with the torsion angle being used as a control parameter for actuating the wrapping apparatus and/or turning off of the delivery elements. At that, according to a further development of the present invention, the torsion angle can be measured with at least two discs, spools and the like mounted on the drive shaft and cooperating with appropriate sensors. By shifting the sensors in a circumferential direction and/or by forming the both discs with hole patterns, which provide for pulse counting, a signal can be generated which can be used, e.g., for actuation of the wrapping apparatus.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DESCRIPTION OF THE PREFERRED EMBODIMENT

Figure 1:
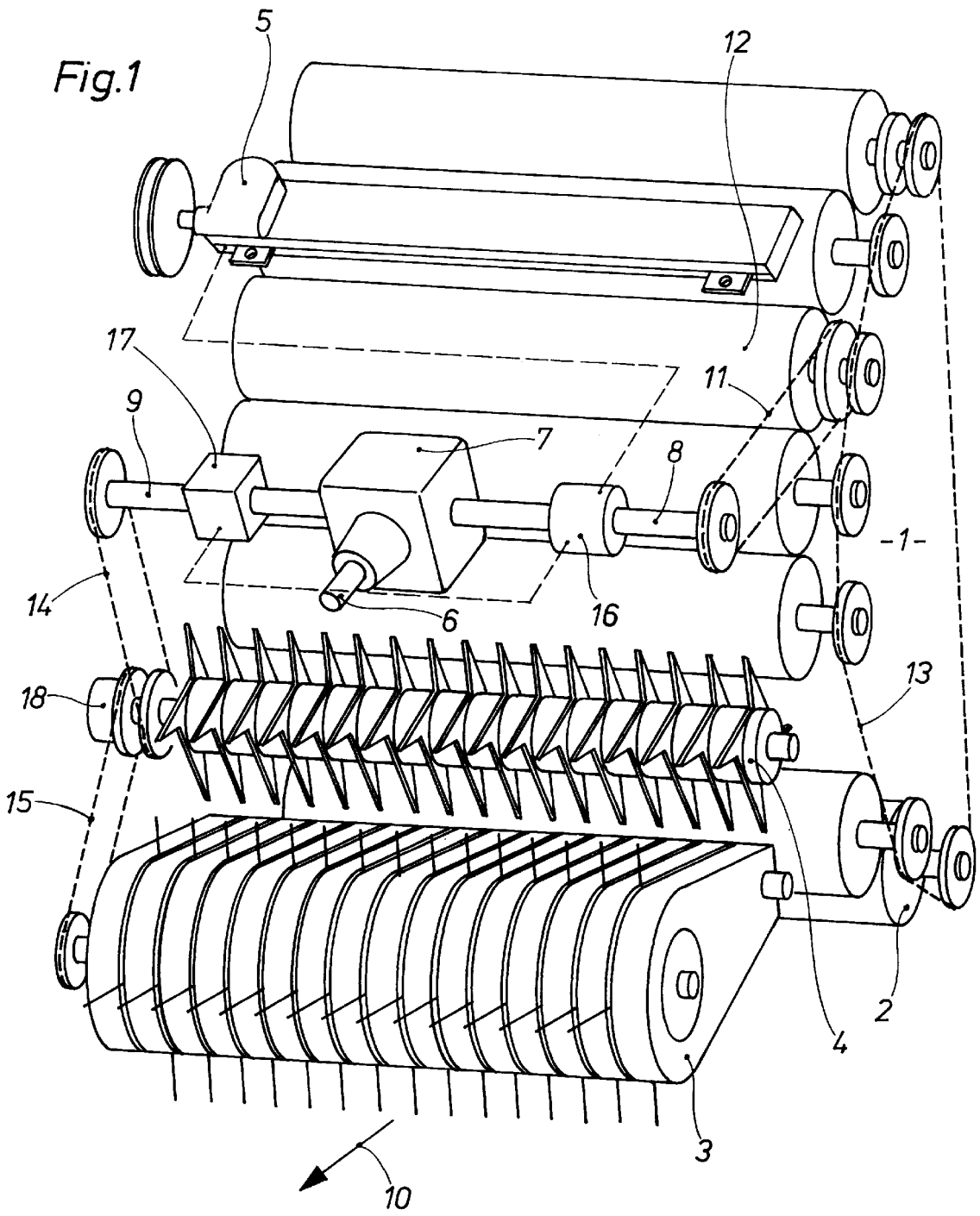
FIG. 1 is a schematic perspective view of a front portion of a first embodiment of a round baler according to the present invention.
Figure 2:
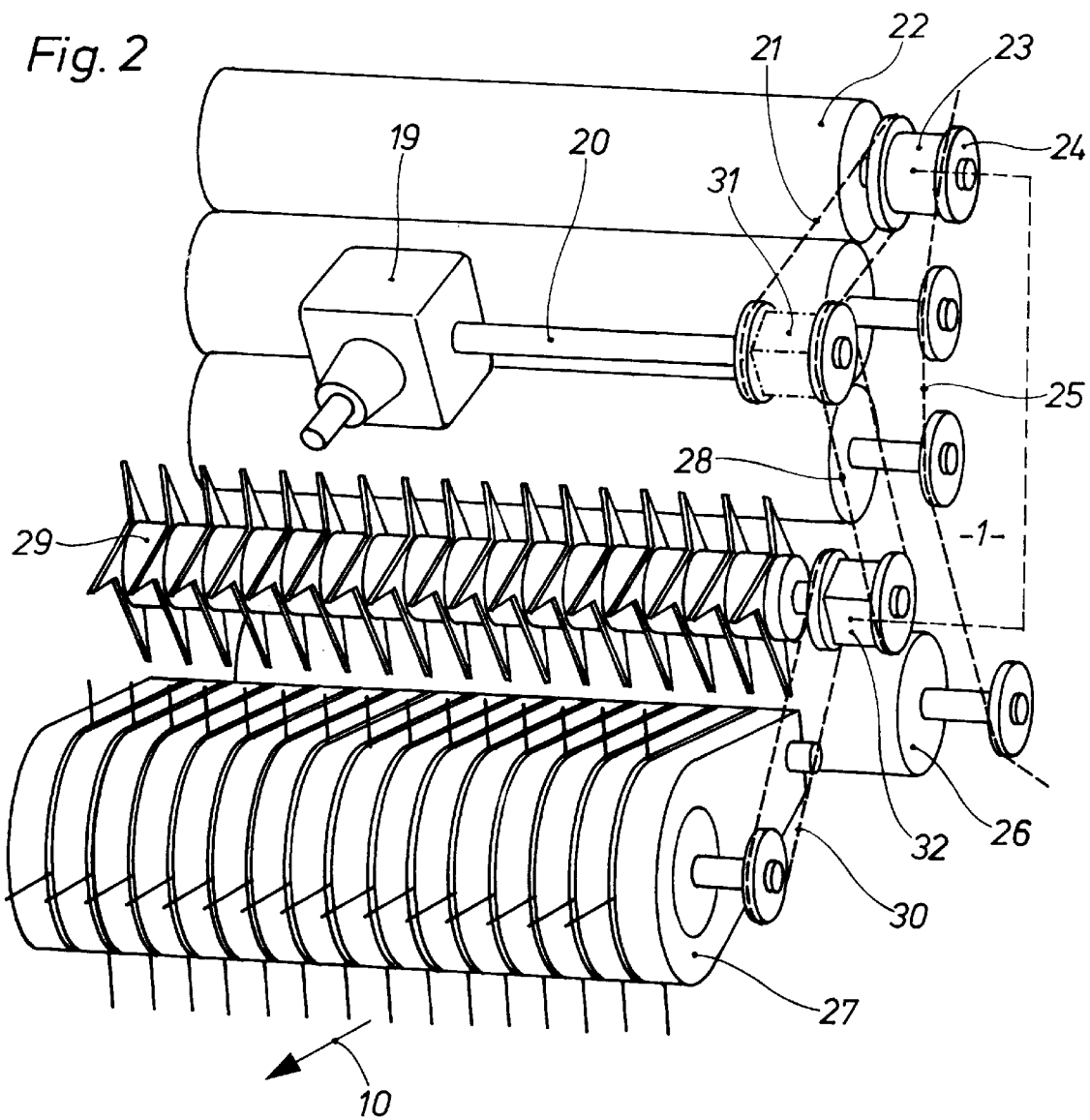
FIG. 2 is a schematic perspective view of a front portion of a second embodiment of a round baler according to the present invention.

Front portions of first and second embodiments of a round baler according to the present invention are shown in FIGS. 1–2. It includes a bale chamber 1 having a constant diameter and including as compression elements, rollers 2, slat chain conveyors or belts. The round baler further includes a pick-up member 3, a conveying rotor 4, which cooperates with cutting blades (not shown), and a wrapping apparatus 5 for binding the round bales with twines. However, a net wrapping apparatus or the like can also be used.

The baler is displaced with a tractor (not shown), with the baler being attached to the tractor the drive shaft of which is coupled to an input shaft 6 of a main drive 7 of the baler. The main drive 7 has two output shafts 8 and 9. The leftside, when viewed in the direction of the baler movement as shown by arrow 10, shaft 8 drives, via chain drive 11, the main drive roller 12 from which all of the other conventional rollers 2 are driven via a chain drive 13. The rightside shaft 9 drives, via a chain drive 14, the conveying rotor 4 and, via a further chain drive 15 driven by the rotor 4, the pick-up member 3. The leftside shaft 8 is equipped with a commercially available torque indicator 16 which serves as a load sensor for the rollers 2, 12 the drive forces of which progressively increases with the increase in compressed density. The rightside shaft 9 is equipped with an overload clutch, e.g., with an engaging/disengaging cam clutch 17. The torque indicator 16 forms part of control circuit, which is shown in dashlines, for controlling the drive, not shown in detail, of the wrapping apparatus 5. The torque indicator 16 is also operatively connected with the cam clutch 17. During the baler operation, the torque of the drive shaft 8, which drives the rollers 2,12, progressively increases with an increase of the compression density in the bale chamber 1 until it reaches a predetermined magnitude and generates a signal for actuating the drive of the wrapping apparatus 5. Because the threshold magnitude of the torque indicator 16 is always so selected that it lies below the maximum allowed load rate of the drive of the rollers 2, 12, and is independent of the load rate of the preceding operational element, the conveying rotor 4, binding of a compressed bale is always insured. Occasionally, it may be desirable, with the actuation of the wrapping apparatus 5, to simultaneously turn off the conveying rotor 4 and the pick-up member 3. This is effected in a simple manner by communicating a control signal from the torque indicator 16 to the cam clutch 17. However, if desired, only the pick-up member 3 can be turned off. This is achieved by providing an electromagnetic clutch 18 in the drive of the pick-up member 3. The operation of this clutch 18 can be controlled by the torque indicator 16, with the control signal being generated when the load torque is, e.g., from 2 to 5% bigger than the predetermined torque that actuates the knotter 5. Thereby, the delivery of crop into the bale chamber 1 is constrained, and the tractor driver must stop, as the pick-up member 3 reject the material. The signal, which is generated by the torque indicator 16 for turning off the delivery pick-up member 3 and the rotor 4, can be also used for actuation of the wrapping apparatus 5. However, a manual actuation of the wrapping apparatus 5 is also possible which would insure an orderly binding of bales in an extreme case.

Instead of a controlled cam clutch 17, an automatically disengaging cam clutch can be used, which would be actuated when a maximum load rate of the delivery member (s), the pick-up member 3 and/or the conveying rotor 4, is reached. The maximum load rate of the pick-up member 3 and the conveying rotor 4 is so selected that it is smaller than or equal to the maximum load rate of the compression elements, rollers 2,12, which insures that the wrapping apparatus 5 is actuated by the torque indicator 16 which serves as a load sensor.

In the embodiment shown in FIG. 2, the main drive 19 has only one output shaft 20. A drive chain 21 connects the output shaft 20 with the main drive roller 22 which carries a torque indicator 23 mounted on the drive stub of the drive roller 22. The torque indicator 23 is connected with a sprocket 24 of the chain drive 25 which drives the other rollers 26. The torque indicator 23 indicates the load applied to all of the rollers 26 but not the load of the main drive roller 22. Because the drive torque of the main drive roller 22 equals to about only 5% of the total torque (the rollers provided in the bottom of the bale chamber transmit a larger torque), the sensing of the torque of the other rollers 26 is sufficient for the actuation of the wrapping apparatus when, e.g., a first predetermined value is achieved, and for turning off the pick-up member 27 when a second predetermined value of the torque, which is sensed by the torque indicator 23, is achieved. A second chain drive 28 connects the output shaft 20 with the conveying rotor 29, and another chain drive 30 leads from the conveying rotor 29 to the pick-up member 27. An engaging/disengaging cam clutch 31 is provided between the output shaft 20 and the chain drive 24, which controls actuation of the conveying rotor 29 and the pick-up member 27 independence on the load applied to the rollers 26. The cam clutch 31 is connected to this end with the torque indicator 23. A further engaging/disengaging coupling 32 is provided in the drive of the pick-up member 27 and which is also actuated by a signal generated by the torque indicator 23 for turning off the pick-up member 27 when the maximum allowable load of the rollers 26 is exceeded. However, the wrapping apparatus can be actuated independently from the load, e.g., manually, before the maximum allowable load of the rollers 26 is attained, e.g., in a case when no complete bales are formed any more.

Figure 3:
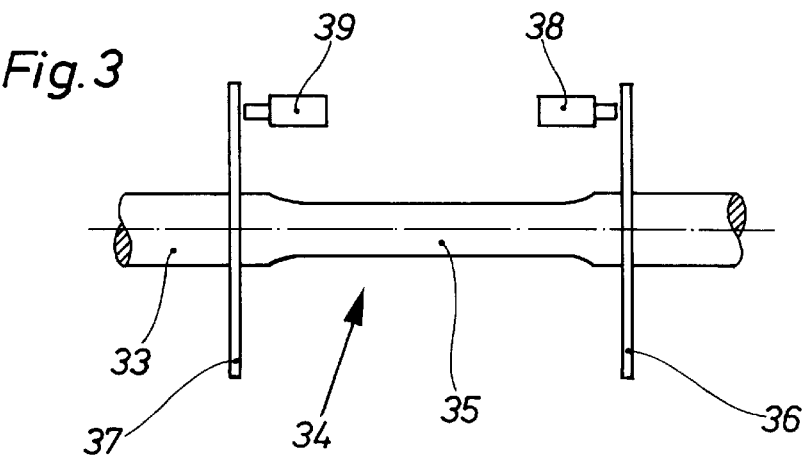
FIG. 3 is a plan view of a drive shaft for a compressing element and formed as a load sensor.

FIG. 3 shows a drive shaft 33 which itself is formed as a load sensor 34 which permits to eliminate the use of a relatively expensive and delicate torque indicator. The middle section 35 of the shaft 33 has, instead of a circular, a somewhat reduced rectangular cross-section which should function as a torsion section indicating a torsion angle. On opposite sides of the torsion section, there are secured two discs 36, 37 respectively, provided with a master hole gauge. In an undrilled condition of the drive shaft 33, the hole gauges are aligned and the alignment line extends parallel to the shaft axis. A sensor 38, 39 is associated with each of the discs 36, 37. The sensors 38, 39 are so offset relative to each other in a circumferential direction that, at a predetermined torsion angle, one of the sensors 38, 39 generates a signal which, e.g., actuates the wrapping apparatus. This embodiment of the drive shaft permits the use for generating a control signal not absolute values of a torque but rather present, e.g., by calibration, load points of the baler elements for controlling the functions of the baler.

As a load sensor, e.g., a dynamometer can be used which would measure the reaction of the support of the drive shaft 8 in the region of the sprocket of the chain drive 11. As a control value, a reaction of the support of the drive side of the main drive roller can be used. Further, the load of a baler element can be determined by measuring a chain tension, e.g., with a tension roller, in the load run of the chain drive 11.

Though the present invention was shown and described with references to the preferred embodiments, various modifications thereof will be apparent to those skilled in the art and, therefore, it is not intended that the invention be limited to the disclosed embodiments or details thereof, and departure can be made therefrom with in the spirit and scope of the appended claims.

What is claimed is:

1. A round baler for agricultural stem crop, comprising a plurality of compression elements; delivery elements; a main drive for driving the compression and delivery elements; drive means for connecting the main drive with the compression elements and the delivery elements; a wrapping apparatus for binding the compressed bales with a binding means; and at least one load sensor provided in the connecting drive means of the baler between the main drive and the compression elements of the baler for generating, in response to a load rate acting on a respective compression element reaching a predetermined magnitude, a control signal for effecting at least one of actuation of the wrapping apparatus and turning off of at least one of the delivery elements, wherein the main drive comprises two output shafts one of which drives the compression elements and another of which drives at least one of the delivery elements, and wherein the load sensor is associated with the one shaft, and the other shaft includes an overload clutch.

2. A round baler for agricultural stem crop, comprising a plurality of compression elements; delivery elements; a main drive for driving the compression and delivery elements; drive means for connecting the main drive with the compression elements and the delivery elements; a wrapping apparatus for binding the compressed bales with a binding means; and at least one load sensor provided in the connecting drive means of the baler between the main drive and the compression elements of the baler for generating, in response to a load rate acting on a respective compression element reaching a predetermined magnitude, a control signal for effecting at least one of actuation of the wrapping apparatus and turning off of at least one of the delivery elements, wherein at least a section of an output shaft for driving the compression elements is formed as a reduced torsion section, with a torsion angle defining the load sensor and serving as a control parameter for at least one of actuation of the wrapping apparatus and turning off of at least one of the delivery elements.

3. A round baler as set forth in claim 2, wherein the torsion angle is determined by at least two discs supported on the output shaft and cooperating with the load sensor.

4. A round baler for agricultural stem crop, comprising a plurality of compression elements; at least one conveying rotor equipped with cutting means; a main drive for driving the compression elements and the at least one conveying rotor; a first drive line connecting the main drive with the compression elements; a second drive line connecting the main drive with the at least one conveying rotor; an apparatus for wrapping finished bales; and at least one load sensor provided in the first drive line for sensing the load rate applied to at least one compression element and for generating, in response to a load acting on the at least one compression element reaching a predetermined magnitude, a control signal for effecting at least one of actuation of the wrapping apparatus and turning off the at least one conveying rotor.

5. A round baler as set forth in claim 4, further comprising an overload clutch associated with the delivery elements and which is actuated by the at least one load sensor, when the load rate acting on the respective compression element exceeds a maximum allowable value, for turning off at least a pick-up delivery element.

6. A round baler as set forth in claim 4, further comprising an overload clutch which automatically turns off at least a pick-up delivery element when a load rate of a conveying rotor reaches a magnitude just below a maximum load rate of the respective compression element to insure binding of a compressed bale.

7. A round baler as set forth in claim 6, wherein the overload clutch is formed as a cam clutch.

8. A round baler as set forth in claim 4, wherein the load sensor comprises a torque indicator mounted on an output shaft for driving the compression elements.

9. A round baler as set forth in claim 4, wherein the load sensor is mounted directly on one of the compression elements from which another compression elements are driven.

10. A round baler as set forth in claim 4, comprising display means for displaying a load acting on the respective compression element.

11. A round baler as set forth in claim 4, wherein one of a support reaction of an output shaft of the main drive and a support reaction of a main drive roller is used as a control parameter for effecting at least one of actuation of the wrapping apparatus and turning off the at least one delivery element.

12. A round baler as set forth in claim 4, wherein the first drive line includes a chain drive means, and the load sensor measures a chain tension of a load run of the chain drive means.

13. A round baler as set forth in claim 4, wherein the main drive has a single output shaft for driving both the compression elements and the at least one conveying rotor, and wherein the load sensor is so arranged that it senses a load rate almost of all of the compression elements, and wherein an overload clutch is provided in the second drive line.

14. A round baler as set forth in claim 4, further including a bale chamber having a constant diameter.

* * * * *